Sept. 2, 1930.    C. L. HAWES    1,774,919
AUTOMOBILE RADIATOR ORNAMENT
Filed Sept. 14, 1928    2 Sheets-Sheet 1

Witnesses:
C. E. Wessels
F. C. Appleton

Inventor:
Charles L. Hawes,
By Joshua R. H. Potts
his Attorney.

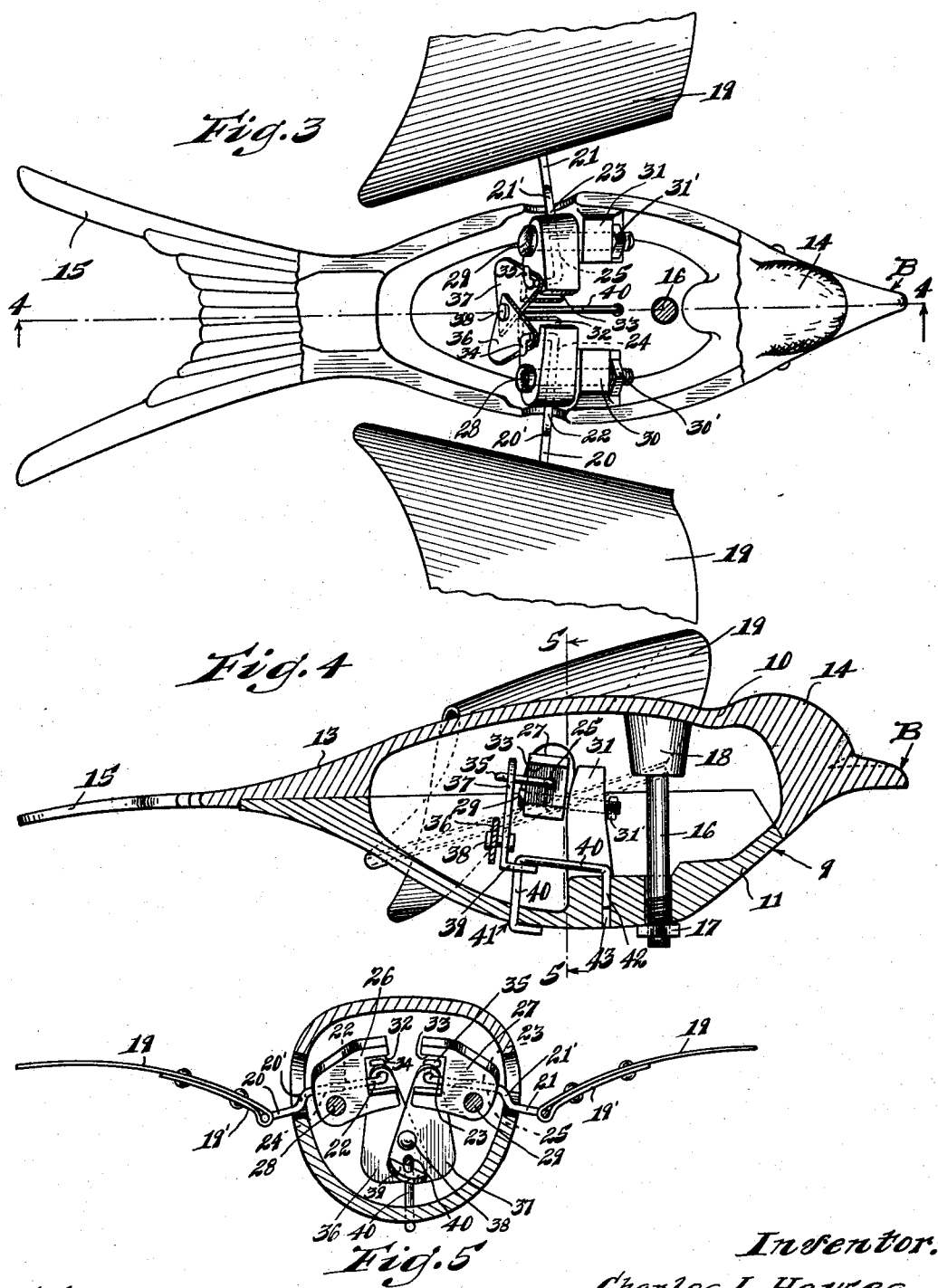

Patented Sept. 2, 1930

1,774,919

UNITED STATES PATENT OFFICE

CHARLES L. HAWES, OF CHICAGO, ILLINOIS

AUTOMOBILE RADIATOR ORNAMENT

Application filed September 14, 1928. Serial No. 305,907.

My invention relates to automobile radiator ornaments and more particularly to an ornament of the kind described having the shape of a bird with wind-operated wings.

The object of the invention is to provide a device of the kind described, of pleasing, artistic appearance, of comparatively simple yet rugged mechanism, and in operation particularly simulating the motions of a flying bird.

Additional objects and advantages of the design and construction employed will appear more fully in the details hereinafter described when taken in connection with the accompanying drawings in which Fig. 1 is a side elevation of my invention as applied to the radiator cap of an automobile, parts of the automobile structure being broken away;

Fig. 3 is a plan view of the invention with part of the upper body casing removed;

Fig. 4 is a longitudinal sectional view taken on line 4—4 of Fig. 3; and

Fig. 5 is a transverse section taken on line 5—5 of Fig. 4.

Figure 1:
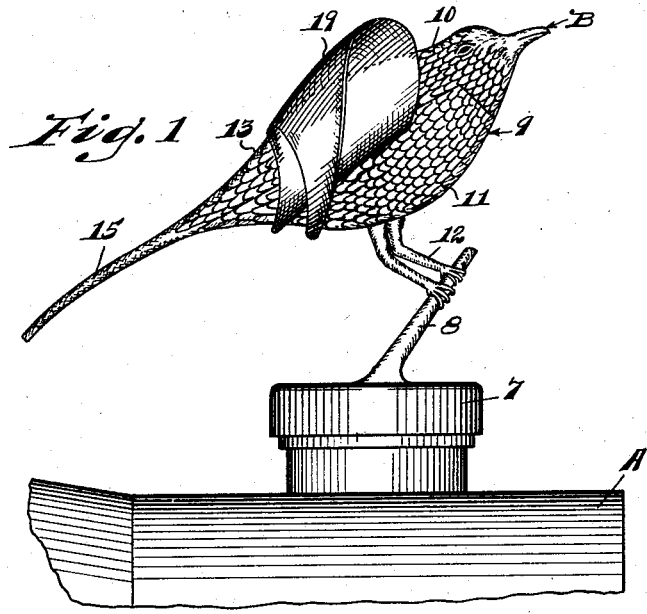
Figure 2:
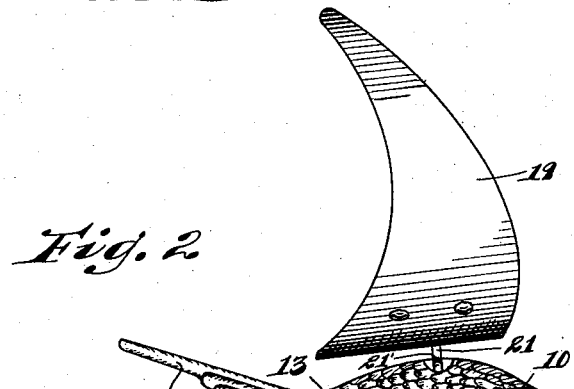
Fig. 2 is a plan view of the device.

In the drawings, A designates the hood of an automobile to the hood cap 7 of which is suitably secured or made integral therewith, a projecting stem 8 having the shape of a branch of a tree, upon which is mounted the bird B.

As exteriorly viewed, the bird comprises a casing 9, having an upper or lid section 10 and a registering lower or body section 11 to which latter are integrally secured the legs 12, which grasp the branch 8. As best shown in Figures 4 and 5, the casing 9 serves to enclose a mechanism hereinafter to be described, the upper section of the casing being configured to provide an integral head 14 and tail 15. The upper section is secured to the lower body section by a bolt 16 to which is threaded the nut 17, the bolt being anchored in a downwardly projecting socket member 18 integral with the upper section.

Projecting from either side of the bird is a pair of wings 19, 19 having folded over and riveted portions 19′, 19′ to fasten the inserted ends of links 20, 21 which latter pass through apertures formed between the registering top and bottom sections 10 and 11, respectively. It will be observed that links 20 and 21 after immediately passing into the interior of the body of the bird have a bent portion 20′, 21′ joined to straight portions 22, 23 which latter pass through and turn in channels 24, 25 provided in a pair of bearing support members 26, 27 these latter being mounted on pintles 28, 29 which are secured in lugs 30, 31 formed integrally with the inner wall of the lower section 11 of the ornament. The members 26 and 27 also have U-shaped recesses 32, 33 which latter serve to permit turning of the U-shaped bends 34, 35 unitary with the inner terminals of the links 20, 21. Pivotally secured to the U-shaped bends are a pair of tapering plates 36, 37, each having a perforation registering with a corresponding perforation in the other of the tapering plates, these perforations permitting the plates to be swingingly joined by a small bolt 38. As best shown in Fig. 4 it will be seen that one of the plates 36 has a small integrally formed projecting lug 39 which is perforated to admit a downwardly projecting part 40 of the link 41 which has a second bent portion 42, turnably secured in a small aperture 43 in the bottom of the section 11.

The downwardly projecting part 40 of the link 41 is passed through the lower bottom wall of the casing and then bent against the exterior surface thereof, in this manner an anchorage being provided to maintain the link 41 in position, and consequently the plates 36, 37 in cooperative relationship while permitting some movement due to the freedom of motion provided between the part 40 where it passes through the hole in the lug 39. As best shown in Figs. 3 and 4, the pintles 28 and 29 are mounted in the lugs 30 and 31 and secured thereto by nuts 30′, 31′.

From the foregoing description, the function and mode of operation of my device has been in part indicated, but will become more fully apparent by the following brief description. Assuming the bird to be mounted on the radiator cap as shown in Fig. 1, and the automobile to be in motion, a current of air will strike against the wings 19, which are in oblique position and serve as levers of the inclined plane order. The tendency of the entire ornament to rise is of course defeated by the device being anchored to the branch 10, but the consequence of the air lift will be to start the wings to rise which in their upward motion and with the momentum acquired by the wings 19 and the elements movably associated therewith will carry the attached links 20, 21 mounted in members 26, 27, thereby rocking the latter. It will be observed that the U-shaped bends 34, 35 of the links 20, 21, to which are pivotally secured the tapered plates 37, 38 will now function as a crank to turn the links 20, 21 and consequently to cause the wings themselves, while rising, to turn from an oblique position to a position substantially parallel to or above an imaginary line drawn longitudinally through the automobile chassis. In the parallel position assumed the air will effect no further lift of the wings which will now tend to fall back by gravity to their former inclined position to be again subjected to the action of the wind as heretofore described. In the case where the wings are carried up by the momentum acquired through the impulse conveyed by an impinging blast of air against the underneath surface of the wings, above the imaginary line drawn longitudinally through the automobile chassis, it will be noted that the breeze or blast will now strike the wings on their upper surface thereby tending to impel them downwardly which will occur until the momentum of the impulse conveyed to the wings in their downward movement will be neutralized by the blast of air striking them from the underneath side, this completing one cycle. In actual practice it will seldom occur that the air impinging against the wings will maintain them in a fixed position, it almost invariably being found that a flapping motion will be conveyed. When the vehicle is in rapid motion, the wings will perform the cycle above indicated with great rapidity, the ornament simulating the flight of a bird in a realistic manner. The curve at which the wings have been cut and shaped has been determined in actual practice to be highly efficient in carrying into operation the flying process indicated. Since in actual practice this ornament is subjected to rather severe usage by reason of the many hours of daily operation the average automobile is put to, the mechanism provided is of a design and ruggedness best calculated to enable the device to perform its functions while insuring a long life therefor.

While I have herein described and illustrated a preferred design and construction, it will be apparent that the invention is capable of considerable modification and variation without departing from the spirit or sacrificing any of the advantages of the details as set forth; hence it is to be understood the embodiment set forth is to be confined to the precise details only to the extent these are circumscribed within the scope of the appended claims.

What I claim as new and desire to secure as Letters Patent is:

1. A device of the class described, comprising a casing, a pair of wings adapted to be actuated by wind, a bearing support pivotally mounted in said casing for each wing, said bearing supports mounted to oscillate upon axes longitudinal of said casing, a link connected to each wing and mounted for oscillatory movement in the associated bearing support, and members having crank connections with said links to cause said wings to oscillate upon axes transversely of said casing as said bearing supports oscillate upon axes longitudinal of said casing.

2. A device of the class described comprising a pair of wings secured to a pair of corresponding links, a casing within which said links extend, a bearing support for each link, said bearing supports pivotally mounted on axes longitudinally of said casing, a crank portion upon each link, and a blade member connected to each crank portion, whereby when said wings are raised by an impinging current of air striking upon the under surface of said wings, said wings will be oscillated to bring their upper surface in the path of the wind.

3. An automobile radiator ornament comprising a two-part casing having the configuration of a bird, means to detachably join said casing to form an inner chamber adapted to serve as a mechanism housing, a pair of wings connected to a corresponding pair of links, said links extending within said housing, a bearing support for each wing link pivotally mounted within said housing, the associated wing link being pivotally mounted within said bearing support, each link provided with an offset crank portion, and a member mounted within said housing and adapted to engage each crank portion, whereby said wings are operated by the action of wind and said bearing supports and crank connections cause the upper and under surfaces of the wings to be placed alternately in the path of the wind.

4. An automobile radiator ornament comprising a casing having the configuration of a bird, said casing including an upper head and tail section registering with and removably secured to a lower body portion, a chamber within said casing, a pair of lugs integral with said body portion, a pair of bolts secured in holes formed in said lugs, a pair of journal members swingable on said bolts, said journal members having U-shaped recesses and apertures communicating with said recesses, a pair of links having crank portions turnable within the said recesses, and straight portions mounted in said apertures, a pair of pivotally joined plates connected to said crank portions, a perforated lug on one of said plates, an anchoring link passed through the perforation of said lug, and a pair of wings fastened to said pair of links exteriorly of the casing.

In testimony whereof I have signed my name to this specification.

CHARLES L. HAWES.